Patented Dec. 14, 1948

2,456,350

UNITED STATES PATENT OFFICE 2,456,350

PREPARATION AND ISOLATION OF ETHYLENE CHLOROHYDRIN

Charles Weizmann, London, England, assignor to Ketarome Limited, London, England No Drawing. Application November 27, 1943, Serial No. 512,039
In Great Britain August 18, 1942

8 Claims. (Cl. 260—633)

This invention relates to the preparation and isolation of ethylene chlorohydrin.

In the industrial production of ethylene chlorohydrin by interaction of ethylene and hypochlorous acid, a very dilute solution of the chlorohydrin is obtained. In most cases the maximum concentration to be attained is 8%. The isolation is usually carried out by distillation, preferably after addition of salt, but even under the optimum conditions, large quantities of water have to be evaporated, and furthermore the chlorohydrin forms with the water constant boiling azeotropic mixtures, so that the isolation becomes complicated and expensive.

The main object of the invention is to provide a process free from the above difficulties, that is, for the comparatively simple isolation of pure ethylene chlorohydrin.

I have now found that this can be achieved by extraction with selective solvents, preferably after addition of inorganic salts to the aqueous solution. In this respect it is recalled that the reaction product obtained as solution from ethylene and hypochlorous acid, contains already considerable amounts of such salt. The extraction can be carried out by the usual methods, e. g. in a countercurrent system.

Suitable solvents comprise those liquid organic substances which contain carbonyl groups, i. e. certain aldehydes, ketones and esters, preferably those which are insoluble or only slightly soluble in aqueous salt solutions. Indeed it may be said that in general certain aldehydes, ketones and esters are particularly suitable as specific solvents, but such groups as halogenides and nitro bodies, for instance, nitro-benzene and dichloroethane I prefer to exclude. Even in the approved groups mentioned there are maxima of activity, and in actual practice one will naturally select these substances of high efficiency, but one will, from an industrial point of view, also have to consider their technical availability and cost.

As indicated, it has been found that in each group belonging to the above defined approved class there are maxima of efficiency.

For saturated aliphatic ketones the region of maximum efficiency lies with those bodies containing 5 carbon atoms, for unsaturated ketones 6 carbon atoms, for alicyclic ketones 5 to 7 carbon atoms and for open chain aldehydes 4 carbon atoms. In the ester series, the activity depends only on the acyl, not—or not markedly—on the alkyl residue; an optimum appears for the esters of acetic acid.

The invention therefore consists in a process suitable for the industrial production of ethylene chlorohydrin by interaction of ethylene and hypochlorous acid in which isolation of the ethylene chlorohydrin is effected by liquid organic solvents which contain oxygen in form of carbonyl groups, e. g. aldehydes, ketones and esters, especially those which are insoluble or only slightly soluble in aqueous salt solutions carrying out the process preferably under maxima conditions as referred to herein.

The invention also consists in processes for the production and isolation of ethylene chlorohydrin substantially as described below.

The following examples illustrate how the invention may be carried into effect, references to parts and percentages being by weight.

Example I 100 parts of an aqueous solution of 9% ethylene chlorohydrin were saturated with common salt and shaken with 100 parts cyclohexanone. The layers were separated and the aqueous layer shaken again with 100 parts cyclohexanone. When the two cyclohexanone extracts were heated to a temperature of 150° C., 7.8 parts and 1.0 part ethylene chlorohydrin respectively distilled off, representing anhydrous and chemically pure samples of the chlorohydrin. The aqueous layer retained therefore only 0.2 part ethylene chlorohydrin = (2.2% of the total amount of the chlorohydrin). If the same process is carried out in the usual type of liquid-liquid extraction apparatus, a small number of passages of the cyclohexanone suffices to free the aqueous layer from the chlorohydrin almost completely.

Example II 1,000 parts of an aqueous solution containing 8% ethylene chlorohydrin, saturated with NaCl, were shaken five times with 200 parts of ethyl acetate. On distillation of the solvent 77.5 parts of pure ethylene chlorohydrin were recovered. The aqueous layer contained only 0.2% of ethylene chlorohydrin.

Example III 1,000 parts of the same ethylene chlorohydrin solution as in Example No. II were extracted three times with 500 parts of furfuraldehyde. 78 parts of pure ethylene chlorohydrin were recovered on distilling the combined organic layers.

Example IV 1,000 parts of an aqueous solution containing 10% ethylene chlorohydrin, saturated with salt, were treated four times with 250 parts of methyl cyclohexanone. Practically all the ethylene chlorohydrin passed into the organic layer.

General

While, as the following table shows, there is practically no limitation to special sub-groups of the above classes of compounds, one will in actual practice select those which combine a high dissolving power for the chlorohydrin with a reasonably cheap price and a good industrial availability.

The figures in the following tables indicate the ratio chlorohydrin in the organic solvent to chlorohydrin in the aqueous salt solution, when equal volumes of the two layers are considered.

Aldehydes

| | |
|---|---|
| Butyraldehyde | 5.0 |
| 2 - ethyl - hexanal | 1.8 |
| Furfural | 4.3 |

Ketones

| | |
|---|---|
| Acetone | 2.8 |
| Methyl-ethyl-ketone | 3.2 |
| Diethyl-ketone | 3.7 |
| Dipropyl - ketone | 2.3 |
| Mesityl oxide | 3.6 |
| 3.4-dimethyl-hexene-(3)-one-(2) | 2.6 |
| Cyclopentanone | 6.3 |
| Cyclohexanone | 6.5 |
| 4-methyl-cyclohexanone | 6.0 |

Esters

| | |
|---|---|
| Butyl formate | 3.3 |
| Ethyl acetate | 4.0 |
| Butyl acetate | 3.6 |
| Isopropyl acetate | 3.7 |
| Cyclohexyl acetate | 4.0 |
| Benzyl acetate | 3.1 |
| Butyl propionate | 2.8 |
| Methyl butyrate | 2.0 |
| Ethyl butyrate | 2.5 |
| Butyl butyrate | 2.1 |
| Butyl isobutyrate | 2.2 |
| Butyl oxalate | 1.9 |
| Ethyl benzoate | 1.7 |

Alcohols

| | |
|---|---|
| 2 - ethyl - hexanol | 1.6 |
| Cyclohexanol | 4.2 |

Ethers

| | |
|---|---|
| Diethyl ether | 0.63 |
| Di-isopropyl ether | 2.5 |
| Ethylene glycol ethyl butyl ether | 2.4 |

For the sake of comparison the following figures for other types of organic compounds (the use of which is not claimed herein) are recorded:

| | |
|---|---|
| Diethyl ether | 0.63 |
| Cyclohexane | 0.16 |
| 1.2-dichloro-ethane | 0.77 |
| Carbon tetrachloride | 0.14 |
| Nitrobenzene | 0.85 |

The figures recorded show that, as explained above, in each group belonging to the above-defined class there are maxima of efficiency.

I regard a co-efficient of 3.0 or higher as indicating a highly efficient substance, but it may be desirable in any given instance to employ a comparatively cheap solvent even if it has only a co-efficient of, say, about 2.5.

Without limiting my invention by it, the following theory can be advanced to explain the features of the present invention. The selective dissolving power for ethylene chlorohydrin is based on an interaction between carbonyl groups and of the chlorohydrin. This interaction may even go as far as the formation of a hemiacetal $$(R_1).(R_2).C(OH).(OCH_2.CH_2Cl)$$

which, however, is only stable in solution. This condition is necessary for the selective action of the solvent, but it is not sufficient for maximum dissolving power. In the liquid phase of the solvent, the hydrocarbon chains in neighbouring molecules are arranged in thread-like form parallel to each other, due to Van der Waals forces between the chains. If the chlorohydrin molecule wants to enter the solvent, it has to overcome this attraction, i. e. its own (chlorinated) hydrocarbon chain must have a higher attraction for the solvent chains than the mutual attraction between two solvent chains. This is the case for a certain chain length in the solvent, and thus the distinct maxima of activity can be understood to which reference has been made. A similar explanation can be given for the extraction of the chlorohydrin with alcohols and ethers.

I claim:

1. In the recovery of ethylene chlorohydrin from the reaction products of ethylene and hypochlorous acid, the process which comprises extracting the chlorohydrin from said ready made reaction products by contacting said products with a water insoluble low molecular carbonyl compound which is an aldehyde, serving as a solvent for the chlorohydrin.

2. In the recovery of ethylene chlorohydrin from the reaction products of ethylene and hypochlorous acid, the process which comprises extracting the chlorohydrin from said ready made reaction products by contacting said products with a ketone containing 4 to 8 carbon atoms in its molecule.

3. In the recovery of ethylene chlorohydrin from the reaction products of ethylene and hypochlorous acid, the process which comprises extracting the chlorohydrin from said ready made reaction products by contacting said ready made products with an aldehyde containing from 4 to 5 carbon atoms which aldehyde is no more than slightly soluble in aqueous salt solutions.

4. In the recovery of ethylene chlorohydrin from the reaction products of ethylene and hypochlorous acid, the process which comprises extracting the chlorohydrin from said ready made reaction products by contacting said products with an alicyclic compound containing at least 5 carbon atoms and containing a $=C=O$ group.

5. A process suitable for the industrial production of ethylene chlorohydrin by interaction of ethylene and hypochlorous acid which comprises the step of isolation of the ethylene chlorohydrin after the reaction has been sufficiently completed, by contacting the reaction product with a neutral liquid organic solvent which contains a carbonyl group.

6. A process as claimed in claim 5 in which the solvent is an ester of acetic acid.

7. A process as claimed in claim 5 in which the solvent is a carbonyl compound containing not less than 4 and not more than 6 carbon atoms.

8. A process which comprises extracting chlorohydrin from a liquid reaction product of a hypochlorite and an ethylene hydrocarbon, after such reaction has been sufficiently completed, and which liquid reaction product contains a relatively great proportion of dissolved salts of alkali-forming metals, which comprises contacting said liquid reaction product with a solvent substantially not miscible therewith, said solvent being a ketone containing 5 to 6 carbon atoms.

CHARLES WEIZMANN.

REFERENCES CITED

The following references are of record in the file of this patent:

UNITED STATES PATENTS

| Number | Name | Date |
|---|---|---|
| 1,394,664 | Brooks | Oct. 25, 1921 |
| 1,496,675 | Irvine et al. | June 3, 1924 |